United States Patent Office 3,337,117
Patented Aug. 22, 1967

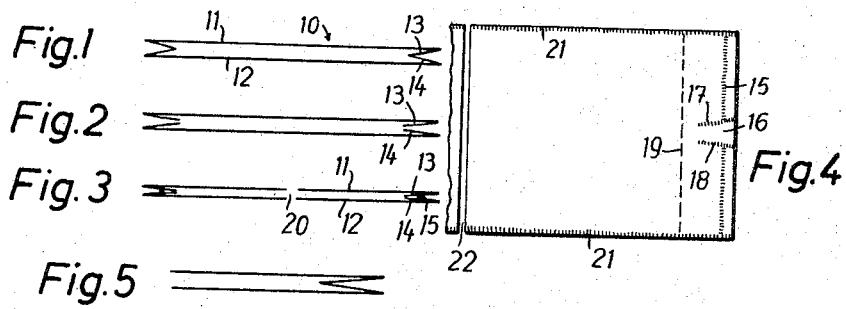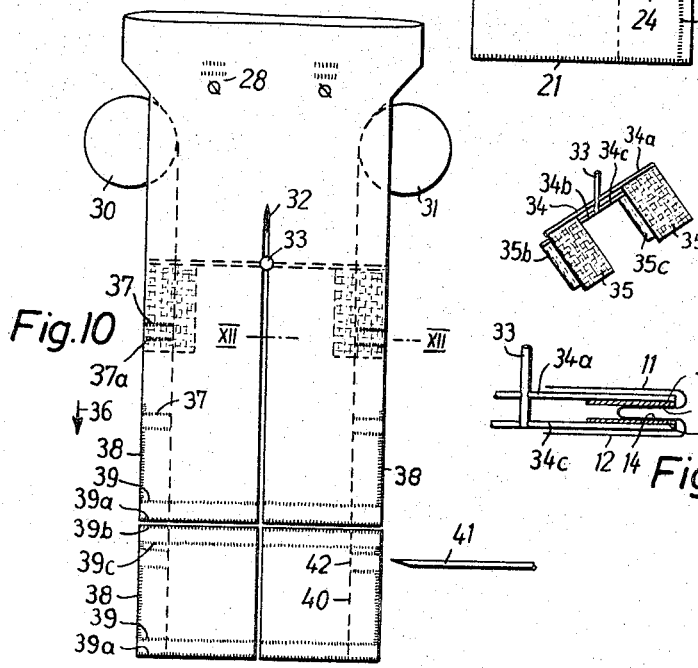

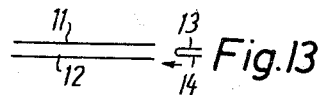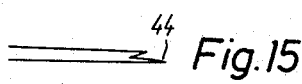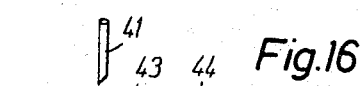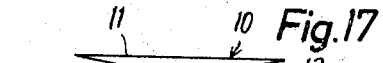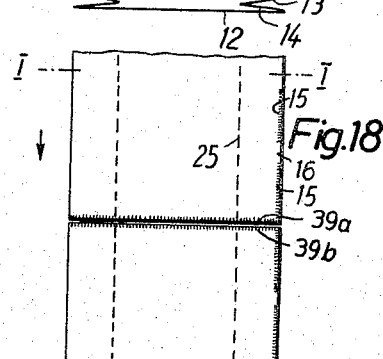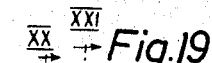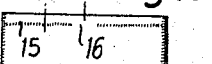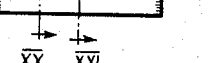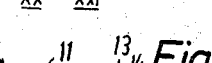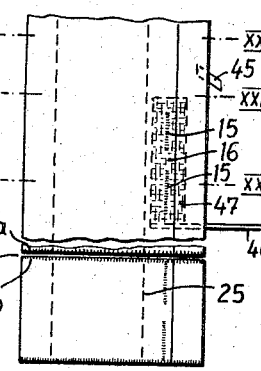

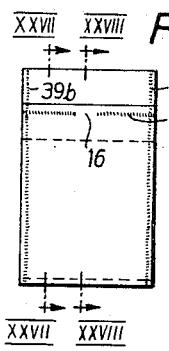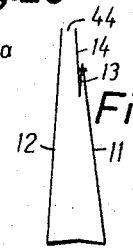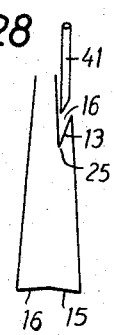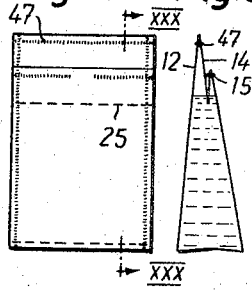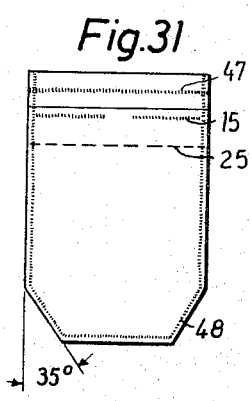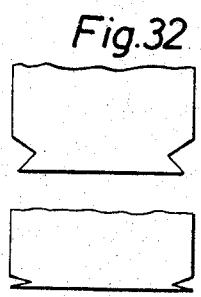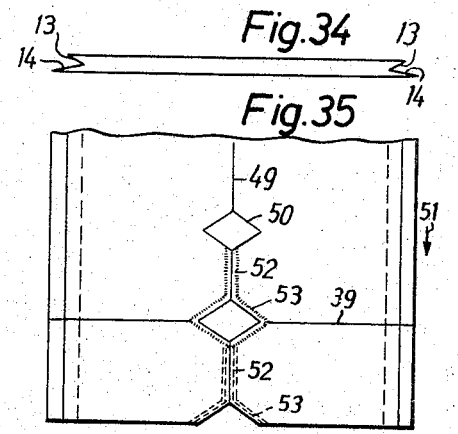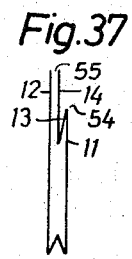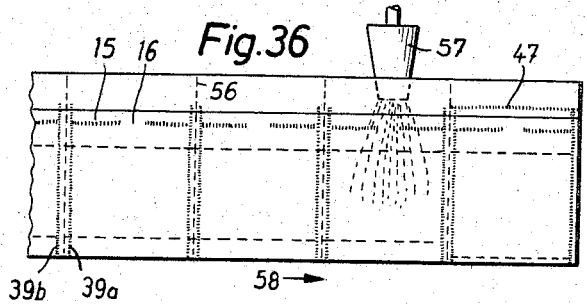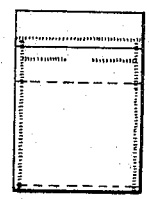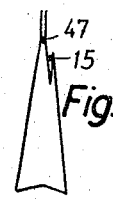

3,337,117
BEVERAGE PACKAGE
Michael Lehmacher and Hans Lehmacher, both of Unterdorfstrasse, Mondorf uber Troisdorf, Germany
Filed Apr. 12, 1965, Ser. No. 449,379
Claims priority, application Germany, Apr. 17, 1964, L 47,623; Apr. 28, 1964, L 47,719; June 5, 1964, L 47,974
16 Claims. (Cl. 229—62.5)

The present invention is concerned with a beverage packaging bag of synthetic thermoplastic film and a method for manufacturing the same. It is an object of the invention to provide structure for a beverage package whereby the package may be fabricated from side-folded or pleated thermoplastic tubular stock without need of complicated and expensive automatic welding devices. Further the beverage pack should be prepared in a rapid series of working operations and be able to be filled with liquid in available filling machines.

For the attainment of this object, in accordance with the invention, it is proposed to manufacture a beverage bag of thermoplastic film, starting with a side folded tube of thermoplastic film, which bag preferably is able to be emptied with a drinking straw introducible into the bag between folds lying against one another, and in which, with the bag full, the fold edge of the two said folds preferably is closed, and further wherein the upper bag edge is seam-welded up to a straw insertion opening, and further in which there is a filling opening extending across the width of the bag and welded closed after filling.

Further it is proposed that, for closing of the straw entrance, the bag walls and the said folds be seamed with a four layer weld at the top end of the bag, or in this region, up to an opening for straw insertion, the opening being preferably in the middle of the bag edge.

In accordance with a further characteristic of the invention it is proposed that, proceeding from a side-folded or -pleated flattened thermoplastic tubular film stock, the side folds, and accordingly also the bag walls, have unequal widths and, that, at the top end of the narrower wall or in the top region, the two side folds be seamed only with this narrow wall, up to a straw insertion opening at its preferably central location; that the wide and projecting side fold, for purposes of filling of the bag with fluid, be cut on its line of fold with the wide bag wall, and after bag filling be again united with the latter through a welded seam. Further, the beverage bag is preferably provided with a base.

The invention is further described in detail with additional features with respect to certain embodiments shown in the drawings. The invention is of course not limited to the embodiments there represented but rather other modifications are possible within the scope of the invention.

In the drawings:

FIGS. 1-3 show a section through a double side folded tube representing working steps in fabrication of a beverage bag;

FIG. 4 is a plan view of a beverage bag fabricated by the steps represented in FIGS. 1-3;

FIG. 5 is a section through a simple side-folded tube;

FIG. 6 shows the joining of the side folds of the tube of FIG. 5;

FIG. 7 is a horizontal section taken along the line VII—VII in FIG. 6;

FIG. 8 shows the results of further working on the tube of FIGS. 5 and 6;

FIG. 9 is a plan view of the finished beverage bag after the working step of FIG. 8;

FIG. 10 is an essentially schematic representation, in plan view, of the fabrication of a beverage bag of the particularly preferred construction form;

FIG. 11 is a perspective view showing the double blades for welding the side folds alone;

FIG. 12 is a vertical section, enlarged in comparison with FIG. 10, of the right part of the tube, taken along the line on XII—XII in FIG. 10;

FIGS. 13 and 14 each show a vertical section through two webs guided and extending in a horizontal plane for fabricating a bag analogous to a side folded tube;

FIG. 15 is a vertical section through a side folded tube extending in a horizontal plane, one longitudinal edge of which projects outwardly beyond the other;

FIG. 16 is a perspective view of a preferred beverage bag construction;

FIG. 17 is a section through a double side fold tube taken along the line I—I in FIG. 18;

FIG. 18 in plan view shows schematically the fabrication of a beverage bag starting with the double side folded tube;

FIG. 19 is a front elevational view of the finished bag of FIGS. 17 and 18;

FIG. 20 is a section taken along the line XX—XX of FIG. 19;

FIG. 21 is a section taken along the line XXI—XXI in FIG. 19;

FIG. 22 represents essentially schematically and in top plan another manner of preparation of a beverage bag in accordance with the invention starting from a double side folded tube;

FIG. 23 is a section taken along the line of XXIII—XXIII, in FIG. 22;

FIG. 24 is a section taken along the line XXIV—XXIV in FIG. 22;

FIG. 25 is a section taken along the line XXV—XXV in FIG. 22;

FIG. 26 is a front elevational view of a beverage bag ready for filling as produced in FIGS. 23-25;

FIG. 27 is a section taken along the line XXVII—XXVII in FIG. 26;

FIG. 28 is a cross section through the beverage bag taken along the line XXVIII—XXVIII in FIG. 26;

FIG. 29 is a front elevational view of the beverage bag of FIG. 26 closed after filling;

FIG. 30 is a section through the bag taken along the line XXX—XXX in FIG. 29;

FIG. 31 is a front elevational view of a modification of the bag of FIGS. 26-30 having beveled corner edges in the bottom region;

FIG. 32 shows the bottom region of the bag represented in FIG. 31, in an intermediate position before being set up in use;

FIG. 33 shows the bottom region of a bag of FIG. 31 when it is standing;

FIG. 34 is a section through a thermoplastic synthetic plastic film tube with double side folds;

FIG. 35 is a top plan view schematically representing the fabrication of the bag of FIG. 31;

FIG. 36 shows, in front elevational view the bags, still connected to each other;

FIG. 37 is a vertical section through one of the bags in FIG. 36;

FIG. 38 is a front elevational view of a finished and filled bag; and

FIG. 39 is a vertical section through a finished and filled bag.

The manufacture of the beverage packaging bag in accordance with FIGS. 1-4 begins with a double side folded tube of thermoplastic synthetic film, that is, a tube 10 which is provided with bellows-like side folds on both of its longitudinal edges. By the term "side folded tube" is also to be understood such tubes as those which originated at the extrusion press as a simple tube lacking side folds, which however are obtained by a subsequent in-folding operation. The procedure of FIGS. 1 to 4 is also possible with a tube provided only on one side with a side fold and the opposite side of which can be either open or closed, preferably however being open. The representation of FIGS. 1–3 discloses a method which is particularly advantageously used because two beverage bags are simultaneously prepared side by side.

In FIG. 1 at 11 and 12 are indicated the upper and lower bag walls, the faces of the side folds being designated at 13 and 14. Only the right half of the bag is provided with reference numerals in these figures and will be described. It is to be understood however that the left half of the tube is simultaneously worked and that the description in reference numerals are likewise applicable thereto.

Starting with the side folded tube of FIG. 1, as indicated in FIG. 2, the faces 13 and 14 of the side fold are separated by a cutting knife along their inner fold line.

Thereafter the upper bag wall 11, the lower wall 12 and as well the side fold faces 13 and 14 are welded together by a welded seam 15 in the region adjacent the edge as shown in FIGS. 3 and 4, or as is also possible on the very outer edge thereof, up to an opening 16 provided for introduction of a drinking straw. This welding 15 represented in FIGS. 3 and 4 is therefore a four-layer welding and likewise the welded seams 17 and 18 laterally delimit the straw slot 16. Likewise a four-layer welding is represented by the welding seams 17 and 18, laterally delimiting the slot 16 for straw insertion, which seams are convergently directed towards the middle of the bag and do not reach to the interiorly disposed edges 19 of the cut side fold faces 13 and 14.

Next the tube of FIGS. 1 and 2 is cut through at the middle by a severing cut 20 and then the transverse weldings 21 are made. These transverse welds are produced intermittently, that is, a transverse weld is made for each respective advance of the tube by the width of a bag. The bag is filled with liquid, milk for example, at the open end 22 and then after filling is closed in known manner, as by weld seaming. In the filled bag the faces 13 and 14 at the side folds lie tight against one another, so that escape of the liquid through the drinking straw opening 16 is prevented, and thereby constitute a check valve. With an appropriately dimensioned contact surfaces of the side fold faces 13 and 14, also the weld-seams 17 and 18 can be omitted.

In FIG. 5, in accordance with the invention, again the fabrication begins with a side folded tube, and next the film sides, which provide the bag walls 11 and 12, are lifted away from each other, so that by means of a suitable work tool a joining of the faces of the side fold parts 13 and 14 can be obtained. This union can result by the production of the welding seams 23 and 24 disposed as in FIG. 7, which unite the side fold faces 13 and 14, and which again advantageously laterally delimit the straw insertion opening and converge towards the middle of the bag. FIGS. 6 and 7, the inner fold of the side fold faces 13 and 14 is not cut off along the entire length, but rather in the straw opening region only there is a cut 26, arcuate in the construction of FIG. 7 but which also can be straight.

Adhesion of the opposed side fold faces 13 and 14 can also be obtained through rolls 27 and 28 which are applied to opposite sides of the faces 13 and 14 and through use of heat and pressure achieve an adherence of these faces. This is shown merely schematically in FIG. 6. The adherence is then advantageously produced over the entire surface, and also the inner fold 25 then is cut off along the entire face. An adherence of the opposed faces of the side fold parts 13 and 14 can also be produced by an adhesive or other operation, which unites the opposed faces with an adhesion of such degree that, upon introduction of a drinking straw through the slot 16, as represented in FIG. 4 and in FIG. 9, faces are separated, but at the same time an escape of fluid from the bag at the slot 16 is prevented, since the opposed surfaces of the side fold parts 13 and 14 lie against each other in a liquid-tight manner.

It is also possible corresponding to the proposal of FIG. 6 to apply to opposite sides of the parts 13 and 14 pressure rolls which have a rough surface and "mill" or indent the face parts together, so that they are interlocked, knurled or indented into each other, and thereby produce a fluid tight arrangement, which however upon introduction of the drinking straw is freed at the point of and in the region of the place of insertion.

Next the film faces 11 and 12, which later provide the bag walls, are again laid flat, and the four-layer weld 15 is made with the slot 16 present in what will later be the bag center for introduction of the drinking straw, as already described in FIGS. 1–4. Then, in the manner already described, there follows the transverse welding for finishing the bag, which in FIG. 9 also is open at one side.

FIG. 9 shows the top plan view of a finished bag. In stippled lines are represented the weld-seams 23 and 24 which weld only the side fold parts 13 and 14 to each other. The uncut part of the inner fold of the side fold faces 13 and 14 is designated 25, while here again the cut part in the region of the straw insertion opening is represented at 26.

In FIG. 10 fabrication again starts with a tube of such width that two bags are made in one working operation. The tube having the walls 11 and 12 is printed in known manner and has the printed fields 28 and 29 which are located appropriately for a respective bag. Through rolls or like folding devices 30, 31, the edges of the tube 10 are folded inwardly so that the aforedescribed side folds 13 and 14 result. Next the tube 10 is slit completely along its middle by a knife 32 and in the slit, there is inserted a rod 33 having outwardly extending arms 34, 34a, 34b and 34c disposed in the tube transversely to its direction of motion, to the ends of which arms are attached the Teflon flaps or vanes 35, 35a, 35b and 35c. These vanes in simple manner permit the welding of the side folds 13 and 14 to one another exclusively without effect on the bag walls 11 and 12, because in accordance with FIG. 12, the vane 35a attached to the spreading arm 34a is disposed between the faces of the bag wall 11 and side fold 13, and the vane 35c on the arm 34c is disposed between the side fold 14 and the bag wall 12, so that a welding device gripping the parts from the outside in pincers-like manner welds the side folds 13 and 14 to one another, but not however, the side walls 11 and 12. The outrigger arms with the vanes are stationary, while the tube 10 is continually or intermittently advanced in the direction of the arrow 36 for bag preparation.

In accordance with the embodiment in FIG. 10, in the aforedescribed manner there are produced for uniting the side folds 13 and 14 two adjacent welding seams 37, 37a so spaced that a drinking straw is correctly and easily introducible into the finished bag.

Next on each tube half the side edge weld 38 is made, followed by the transverse welding to produce a finished bag, and finally the severance thereof from the tube by the principle of side seam welding. Basically there are present two adjacent seam welds and a separating seam lying therebetween. In accordance with the embodiment in FIG. 10 the operations are carried out with the side seam welding operation in which however in one working step four weld seams 39, 39a, 39b and 39c are produced with a severing cut between the welded seams 39a and 39b. Thereby there are obtained at both sides of a bag the pockets represented in detail in FIG. 16.

In the representation of FIG. 10 there results no cutting of the fold lying between the bag walls 11 and 12 along the edge 40 of the side folds 13 and 14, because in accordance with a further inventive feature, the cutting at 42 for insertion of the drinking straw 41 in the finished, filled and completely closed bag is attained by the drinking straw 41 itself, which has both a rigidity and hardness sufficient for that purpose and particularly is pointed at its forward end. The drinking straw advantageously is comprised of synthetic plastic, because the material used for such straws has the desired properties.

FIGS. 13 and 14 show that the invention can be carried out in simple manner when the process begins not with a side folded tube or a tube converted into a side folded tube, but rather with two tube webs 11 and 12, between which are inserted the side folds 13 and 14, comprised of a folded band or strip, as schematically represented in FIG. 14.

To facilitate insertion of the drinking straw 41 in the intended passage, in accordance with FIG. 15 it is proposed that there be a projection edge 44 and consequently a side fold 14 of greater width than the side fold 13. This essential feature is hereinafter explained in further detail.

In accordance with FIG. 16 a beverage bag has on the longitudinal edges respective pockets, which are obtained insofar as four weld seams are made as in FIG. 10 with a separating cut between the weld seams 39a and 39b. It is also possible to do without the pockets. Also the welding seams 39b and 39a may have only slight strength. The bag in accordance with FIG. 16 has a base which is obtained in simple manner from a side fold, that is, deviating from the description of the fabrication method of FIG. 10, two adjacent bags are not produced but rather only a single bag and the side folds on this side of the tube are used for the base.

Also with the bag fabricated in accordance with FIG. 16 there results a penetration of the side folds 13 and 14 in the region of the insertion channel for the drinking straw 41 by the straw itself at the location 42. Further the bag in FIG. 16 shows that for formation of the straw insertion channel only a single welding 37 of the side folds 13 and 14 is made, because this is laterally displaced and lies in the region of the weld seam 39c. Further there is also present a notch or gap 43 through the walls 11 and 12 in the upper region of the bag acting as a slit enabling tearing the bag open when the contents are to be poured rather than removed through a drinking straw.

In accordance with FIG. 17 the fabrication again starts with a double side folded tube and on one tube side a four layer weld 15 is made which unites the sides 11, 12, 13 and 14, but with this welding seam however interrupted for formation of a straw entrance 16. The inner fold 25 of the side folds 13 and 14 remains closed and is only pierced by the drinking straw. Also the side folds 13 and 14 are in no way united, except by the aforementioned welding 15. Next is made the side seam welding, comprised of the weld seams 39a and 39b and the separating cut lying therebetween.

A drinking straw 41 of sufficient rigidity, advantageously also pointed at its forward end, perforates the fold 25 of the side folds 13 and 14 lying between the bag walls, and upon withdrawal of the straw 41 the perforation again closes itself, so that the beverage bag remains fluid tight. In FIGS. 20 and 21 for purposes of disclosure, the side folds 13 and 14 are not represented lying in contact.

In FIGS. 22 to 29, again the fabrication of the beverage bag starts with a double side folded tube 10. While the side folds on the left side of the tube have equal width, on the other side the side folds 13 and 14 have unequal widths so that the tube walls 11 and 12 also are equal in their width. Next, the tube is continually slit along the fold line 44 by a blade 45 so that, as is seen from FIG. 24, the side fold 14 is separated from the bag wall 42.

At a subsequent work station, a weld-preventing Teflon web blade or vane 47 is introduced on a rod 46 between the side fold 14 and the tube wall 12, so that at the upper edge of the shorter bag wall 11 a three-layer welding 15 can take place uniting the wall 11, the side fold 13 and the side fold 14 with one another. Welding of the side fold 14 with the bag wall 12 is prevented by the Teflon web. This is not a continuous weld, but advantageously there remains, in what is later the center of the bag, a slot 16 for introduction of a drinking straw 41 represented in FIG. 28 and hereinafter described.

At a subsequent work station there are made the two transverse welds 39a, 39b with the separating cut 56 lying therebetween, which weld together the bag walls 11 and 12 and also on both margins the side folds 13 and 14. In FIG. 22 for purposes of clearer overall representation, the welds 15 are not successively represented. In practice, the production of the welds 15 generally results, intermittently and one welding 15 follows upon another. Here it is to be noted that the entrance 16 represents a gap or interruption of the weld seam 15, which is obtained in a simple fashion with a recess in the face of the welding jaw element.

FIG. 26 shows in front elevation a beverage bag ready for filling. It is seen from the cross section in FIG. 27 that a filling opening extending over the entire width of th bag is provided by a cut 44; and from FIG. 28, that the weld 15 connects the shorter bag wall 11 with the side folds 13 and 14 up to the aforementioned gap 16. Through the latter can be introduced the drinking straw 41, comprised of a plastic of sufficient hardness and pointed at its lower end, so that it penetrates the fold 25 between the side folds 13 and 14 for opening of the filled bag.

FIG. 29 in conjunction with FIG. 30 shows that for closing of the liquid filled bag the side fold 14 is united with the bag wall 12 by a weld 47. There is involved a two-layer welding, which is easily carried out.

FIG. 31 shows a bag having a filling opening and bag closure corresponding to the arrangement represented in FIGS. 26–30. Only here the base of the bag is not formed by a side fold, but in accordance with a further inventive feature a self-standing is obtained by corner beveling the lower bag edges, with the beveling advantageously having an angle of 35 degrees with the longitudinal bag edges. Thereby it results that in a filled bag placed on a table, the bevels 48 abut in the middle fold up inwardly; and with a standing bag, as shown in FIG. 33, is completely folded together so that in any case a self standing bag is obtained.

In accordance with the invention it is further possible in a single working procedure to fabricate two adjacent standable bags from a tube having side folds located on both longitudinal edges as shown in FIG. 34.

FIG. 10 shows that from a single tube two bags likewise can be simultaneously fabricated in a single working procedure. These however do not have a distinct base. In the working method of FIGS. 23–30, a bag with base faces is indeed obtained but there only one bag can be fabricated from a single tube width.

FIG. 35 in contrast shows the possibility of making in a single working step and from one tube a bag having a sufficient base surface so that the filled bag can stand with sufficient stability.

First in the middle of the tube a cut 49 is produced and a parallelogram 50 is punched out. This punched opening and the cut 49 are obtained suitably through a heated band, which is easily yieldably flexed in the direction of its feed. Next with an advance of the tube in the arrow-indicated direction 51, in a slight lateral spacing from and on both sides of a cut 49 there is made a weld 52 and also around the parallelogram a weld 53. Thereby the bag walls 11 and 12 are welded along their bases, and on the bevels, with four bags being welded in one working step, though as FIG. 35 shows only over one half. In FIG. 35 the previous weldings 52 and 53 are represented in dashed lines. It is also possible to produce the separating cut 49 in the stamping of the parallelogram simultaneously with the welding 53 and 52 in one working step. For the purposes of clarity however these two stages are represented and described one after the other.

In FIG. 35 for the purpose of simplified representation, the weld 15 and also transverse welds at 39 are not represented, although there does appear the severing cut between the transverse weld for separation of the finished bag.

In FIGS. 36–39 is shown the further proposal in accordance with the invention of not separating the beverage bags from one another after their production, but rather to leave them attached, so that a belt or a chain of connected bags can be introduced into a filling apparatus.

It is also possible, after preparation of the connected bags to wind them up into a supply roll and to introduce this supply roll in a filling machine. It also lies within the scope of the invention to combine apparatus for the fabrication of the beverage with a filling apparatus.

To attain this, it is proposed that the transverse welds not extend over the entire bag height, but that these terminate shortly beyond the fold line 54 of the short side fold 13 with the short bag wall 11. Thereby, as shown particularly in FIG. 37, there is obtained between the bag wall 12 and the side fold 13 and the side fold 14, a continuous channel 55 uninterrupted by transverse welds. In this channel there is disposed the stationary filling head 57 for the liquid to be packaged in the bags, while the connected bags are moved in the direction indicated by the arrow 58. After filling of the individual bag, the bag opening is closed by a weld 47 and finally the bags are separated from one another.

The separation of the bags can result by locating a perforation line 56 between the transverse welds 39a and 39b. Then for separation of the filled bag, only a tug need to be applied to it. The separation, however, can also be obtained by a vertically disposed separation knife which cuts between the transverse welds 39a and 39b.

FIG. 38 shows in vertical front elevation a filled bag which corresponds to the bag represented in FIG. 29 except for the difference that the transverse weld 39 does not reach to the upper bag edge. FIG. 39 shows in section the filled bag which corresponds to the bag of FIG. 30 except for the aforemetnioned modification, that the transverse weld does not run to the upper bag edge and also, correspondingly, the weld 47 for bag closure lies at a suitable spacing beneath the upper bag edge.

In the drawings it is to be understood that for clarity of representation, the flat sides 11, 12 of the tubular film stock, from which the main wall portions of the bags result, are shown well separated; and so also, at the inward folds on each edge of the work piece, the minor film portions or inner fold walls 13, 14 are markedly separated, even though the latter would be in substantially complete contact when joined as by the gapped seam welding 15 made longitudinally of the tubular film work piece along the line spaced from the longitudinal inner fold edge 19, 25 or 40 in the various figures. Thus also the region of joining by the seam 15 is shown as though a structure is there inserted spacing the joined film faces, though these are essentially in contact and fused to each other at such seams, as are easily made with polyethylene or polyvinyl type films for example.

We claim:

1. A beverage container bag adapted to be fabricated from longitudinally side-folded synthetic thermoplastic tubular film stock by transverse seam welds and separating cuts and adapted for convenient use of a drinking straw in removing the contents, said bag comprising: first and second main wall film portions of equal width and generally rectangular, flat and parallel to each other when the bag is unfilled; the main wall portions having a liquid-tight connection across and between their bottoms; a top structure including first and second minor film portions running across the entire top width of the main wall portions, said minor portions over a substantial part of their vertical extent, beginning at coterminous bottom margins and over the entire width of the main wall portions, having a face-to-face contact with each other and being in sandwiched relation extending inwardly between top regions of the main wall portions; the upper outer margins of the minor film portions having respective liquid-tight connections to respective main wall portions across the entire width of the bag; respective side seam welds running upward from the liquid-tight connection at the bottom to the said respective liquid-tight connections; a further seam weld having a drinking straw-insertion gap and joining the said minor portions at a location spaced upwardly from said bottom margins and running from one said side seam weld to the other, the face-to-face contact of said minor film portions inward of the last said seam weld affording a check valve-like action impeding escape of liquid upon withdrawal of a straw previously inserted into the bag at said gap; one main wall portion and the adjacent minor film portion being longer respectively than the other main wall and minor film portions.

2. A bag as described in claim 1, wherein a pair of spaced downwardly extending welds joining at least said minor film portions and located on opposite sides of the gap and meeting the last said seam weld provide a reinforced drinking straw insertion passage.

3. A bag as described in claim 1 with said main wall film portions projecting laterally beyond the side seam weld on at least one bag side and the vertical margins of the projecting portions are joined by a seam weld spaced parallel to the adjacent side seam weld to form a straw storing pocket.

4. A bag as described in claim 1 wherein a bottom seam weld provides the said connection between the bottoms of the main wall portions, whereby the bag may be filled at the bottom and then closed by the bottom seam weld.

5. A bag as described in claim 1 comprised of a single piece of film closed upon itself and continuous in passing from one main wall film portion to the other at the bag bottom region, from one minor film portion to the other, and from each main wall portion to the respective minor wall portions.

6. A bag as described in claim 1, comprised of a single piece of film folded upon itself, with the longer portions being free end portions of the folded single piece, and the said fluid tight connection therebetween provided by a closure seam weld, whereby the bag may be top filled and thereafter closed by the last said seam weld.

7. A bag as described in claim 6, wherein the said further seam weld is a three-layer weld also joining the top margin of the shorter main wall portion to said minor portions.

8. A bag as described in claim 7, wherein the film is tuckfolded inwardly at the bottom of the unfilled bag as the liquid tight connection between the bottoms of the main wall portions forming a base whereby the bag is standable on a horizontal surface.

9. A bag as described in claim 1, comprised of a single piece of film folded upon itself, with the bottoms of the main wall portions being free end portions of the folded single piece, the bottom corners of the main wall portions being beveled and the said fluid tight connection therebetween provided by seam welds at the beveled corners and across the bottom, whereby an inward folding of the filled bag at the corner regions and thereby a partial inward collapsing of the bottom are facilitated to form a base when the bag is stood up on a horizontal surface.

10. A beverage container of structure adapted to be fabricated from longitudinally inwardly side-folded synthetic thermoplastic tubular film stock by longitudinal and transverse seam welds and separating cuts and adapted to be readily filled and sealed and thereafter convenient for introduction of a drinking straw for removing the contents from a filled container, said container comprising: first and second main wall film portions of equal width extending upward from a bottom edge of the container in generally coincident, flat and parallel relation to each other when the bag is unfilled but having the first main wall portion longer than and projecting above the other; a top structure derivable from the longitudinal inward side folding of the stock including the projecting part of the first main wall portion and an inward fold of film material continuous with the material of the second main wall portion and sandwiched between the main wall portion top regions, said inward fold defining first and second minor film portions adjacent the first and second main wall portions respectively and running across the entire top width of the main wall portions and continuously joined at the inner fold edge, the first minor portion vertically longer than the second to terminate in a top margin edge free of but substantially coincident with the top edge of the first main wall portion; said minor portions, over substantially the vertical extent of the second minor portion and over the entire width of the main wall portions, having a face-to-face contact with each other; respective side seam welds running upward from the said bottom edge to a level slightly above the top edge of the second main wall portion; a seam weld having a drinking straw-insertion gap and running from one said side seam weld to the other and joining only the said minor portions and the second main wall portion at a location spaced upwardly from said inner fold edge whereby there is available between the first minor film portion and the first main wall portion a top structure opening for introduction of a beverage liquid, said opening after filling sealable by seam welding, from one side seam weld to the other, only projections of the first minor film and first main wall portions above the said second main wall and second minor film portion; the face-to-face contact of said minor film portions inward of the last said seam weld affording a check valve-like action impeding escape of liquid upon withdrawal of a straw previously inserted into the container at said gap for penetration of the inner fold edge.

11. A beverage container structure in accordance with claim 10, adapted for production in simultaneous pairs from a double side folded tubular stock centrally longitudinally slit; wherein the said main wall portions are joined at the container bottom by a seam weld extending from one side seam weld to the other.

12. A beverage container in accordance with claim 11, wherein there is provided a drinking straw packing pocket on at least one longitudinal edge formed by a vertical weld adjacently parallel to a said side seam weld.

13. A beverage container in accordance with claim 11 having bottom corners beveled to afford a structure which after filling may be stood upright on a supporting surface.

14. A beverage container in accordance with claim 13 wherein each bevel has an angle of 35° with the adjacent vertical edge of the container.

15. A container as described in claim 10, comprised of film material continuous through said main wall and minor film portions.

16. A continuous series of containers, each as described in claim 15 and successively connected at side edges, in each of which the said side seam welds extend vertically above the upper margin of the shorter second main wall portion and terminate at locations spaced inwardly of the upper margins of the longer first main wall and minor film portions, thereby to afford a continuous trough between the longer main and minor film portions of the series to receive a filling nozzle, a vertical line of perforations extending the entire container height between the adjacent side seam welds of adjacent containers, to provide a separating line between successive containers for separation after filling.

References Cited
UNITED STATES PATENTS

| 2,560,535 | 7/1951 | Allen | 229—62 |
| 2,799,314 | 7/1957 | Dreyer et al. | |
| 2,804,257 | 8/1957 | Hasler et al. | 299—62.5 |
| 3,189,252 | 6/1965 | Miller | 150—9 X |

FOREIGN PATENTS

| 1,122,898 | 5/1956 | France. |
| 1,128,387 | 9/1956 | France. |
| 612,599 | 11/1960 | Italy. |

JOSEPH R. LECLAIR, Primary Examiner.

DAVIS T. MOORHEAD, Examiner.